United States Patent [19]
Port

[11] 3,791,874

[45] Feb. 12, 1974

[54] BATTERY CONTAINER

[75] Inventor: Frederick J. Port, West Chester, Pa.

[73] Assignee: ESB Incorporated, Philadelphia, Pa.

[22] Filed: Mar. 16, 1973

[21] Appl. No.: 341,969

Related U.S. Application Data

[62] Division of Ser. No. 871,207, Oct. 17, 1969, Pat. No. 3,746,579, which is a division of Ser. No. 726,068, May 2, 1968, Pat. No. 3,519,489.

[52] U.S. Cl. .............................. 136/134 R, 136/166
[51] Int. Cl. ............................................ H01m 1/02
[58] Field of Search ....................... 136/134 R, 166

[56] References Cited
FOREIGN PATENTS OR APPLICATIONS
790,025  1/1958  Great Britain...................... 136/166

*Primary Examiner*—Donald L. Walton
*Attorney, Agent, or Firm*—Raymond L. Balfour

[57] ABSTRACT

A battery has a container consisting of an upper portion and a lower portion sealed together in any convenient manner. The cover may be separate from, or integrally constructed with, the upper portion of the container. Single cell or multicell as well as primary or secondary batteries may be so constructed.

In multicell batteries the intercell strap connectors extend through the partitions of the cell compartments, preferably as molded inserts in the partitions. Preferably the ends of the intercell strap connectors are anchored by the container. Strap connectors may extend from end cells through the container as inserts molded therein to function as terminals.

12 Claims, 8 Drawing Figures

PATENTED FEB 12 1974
3,791,874
SHEET 1 OF 3
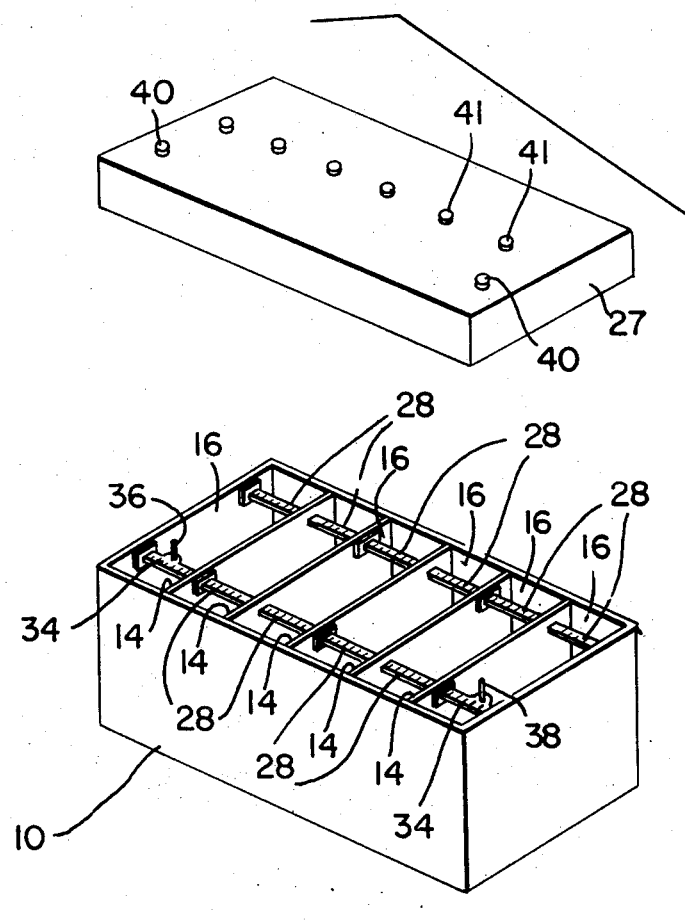
Fig. 1
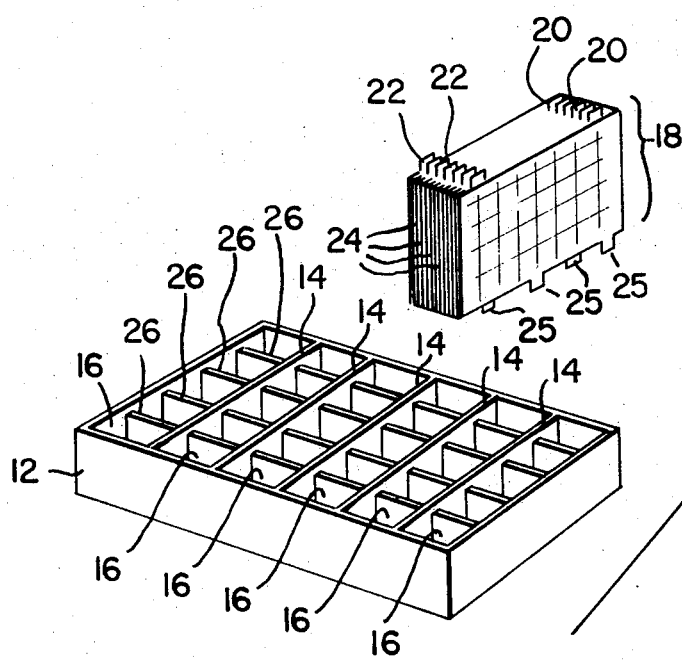

BATTERY CONTAINER

CROSS REFERENCE TO RELATED APPLICATIONS

This application is a division of co-pending Ser. No. 871,207 filed Oct. 17, 1969, now U.S. Pat. No. 3,746,579, which in turn was a division of Ser. No. 726,068 filed May 2, 1968 (now U.S. Pat. No. 3,519,489).

BACKGROUND OF THE INVENTION

The background of this invention will be discussed in terms of the multicell lead-acid automotive battery.

In the automotive battery industry the work "stack" is used to include a collection of alternatively spaced positive and negative electrodes. The stack could include only one positive and one negative electrode, but typically several electrodes of each polarity are included and it is common practice in the automotive battery industry for there to be one more negative electrode than positive electrode. These electrodes are frequently referred to as "plates", perhaps because of their thin, flat, plate-like configuration. Where the electrodes are to be placed closely together it is customary to include insulating separators between adjacent electrodes as components in the stack to prevent adjacent electrodes from discharging against each other, but if the electrodes are to be spaced far apart or if some other means to prevent self-discharge can be devised then these separators are not essential components of the stack. Separators are common components of the stacks used in automotive batteries. The term stack does not include the straps which are subsequently added to connect the electrodes of like polarity together mechanically and electrically. After the positive electrodes have been electrically connected together by a positive electrode connecting strap and the negative electrodes have been electrically connected together by a negative electrode connecting strap the word "element" is applied to the combination of stack and connecting straps. In multicell batteries these elements are electrically connected together in series. There are therefore essentially two problems involved: first, strap connectors have to be added to stacks to create elements and second, the elements have to be electrically connected in series.

There are essentially two alternatives by which strap connectors can be applied to the stacks. In the first the stacks are placed in the container and the strap connectors applied there. With this alternative the container serves as a fixture or jig which holds the stack together while the strap connectors are added. The advantage of this approach is that no separate fixture is required but, where heat is applied to join the strap connectors to the electrodes, the disadvantages include the difficulty in confining the molten metal as well as the possibility that the heat might damage the container or separators. The second alternative, which overcomes the disadvantages of the first, is to add the strap connectors to the stacks outside the container in an element assembly machine and then place the resulting elements in the individual cell compartments of the container. The disadvantages of the second alternative are that the element assembly machines involved are expensive, and the two steps of placing the stacks into the machines and removing the elements from them are in addition to the necessary subsequent step of placing the elements in cell compartments of the containers; except that they permit the connecting straps to be added to the stacks while easily confining the molten metal and without damage to the container, these two steps are essentially unnecessary, for otherwise they contribute nothing to the final product. Use of the element assembly machines is customary throughout the automotive battery industry in the United States today.

The second problem involves the fact that the elements must be connected together in series. Until recent years the strap connectors of an element in one cell compartment did not extend over or through the partition to connect with the element in the adjacent cell compartment and this was true regardless of whether the strap connectors were applied to the stacks inside or outside of the container. Thus is was necessary to devise some way of constructing intercell connectors inside the container after the elements had been placed in the cell compartments. Several such methods are shown in the following recently issued U.S. Patents: 3,275,793; 3,313,658; and 3,336,164. Regardless of how this work was done, there were several problems which were inherently involved. For one, the construction of the intercell connectors was a separate step necessarily following the construction of the strap connectors. Also there was a possibility of a poor electrical connection between components of the intercell connectors or between the intercell connector and the strap connectors. Finally there was the possiblity that electrolyte might leak between the cells through the hole or slot in the partition which was necessarily involved and that discharge of one cell against another might subsequently result.

In recent years techniques have been devised by which to combine the solutions of these two problems. In general, these techniques show the positive electrode strap connector for electrodes in the element in one cell compartment extending through or over the partition to serve as the negative electrode strap connector in the element in the adjacent cell compartment. This extending strap connector thus served an additional function, that of an intercell connector, and therefore might be referred to with the descriptive phrase "intercell strap connector". Just as the strap connector for elements in individual cell compartments could be applied outside or inside the container, so also can the intercell strap connectors. Both methods of constructing intercell strap connectors are illustrated in recently issued U.S. patents. In U.S. Pat. No. 3,350,237 the stacks are first placed in the container and subsequently the intercell strap connector is added. The protection of the container from damage by the heat used to construct the intercell strap connector is one of the problems with which this patent is concerned. In U.S. Pat. Nos. 3,253,962 and 3,309,232 the intercell strap connectors are applied outside the container and an assembly of six electrically connected elements is subsequently dropped into the container. With either of these two construction methods a necessary condition is that there be a slot in either the partition or the cover into which the intercell strap connector may be fitted. One of the earliest constructions in which a slot was provided in the partition to receive the intercell strap connector is shown in U.S. Pat. No. 2,828,349 (that patent does not expressly state whether the intercell strap connector is applied to the stacks inside or outside the container). When the intercell strap connector is fitted into a partition slot the remaining unfilled portion must be filled to prevent intercell leakage of electrolyte either by the use of some kind of insert (see U.S. Pat. 3,253,962) or by a portion of the cover which projects downward to fill the slot (see U.S. Pat. No. 3,309,232). Insertion of a separate insert is avoided where the slot is in the cover (see U.S. Pat. No. 3,350,237) but in all three patents a separate cementing step is required where the intercell strap connector extends through the partition. In addition to requiring a separate step and equipment to perform it, this cementing increases the risk of unsatisfactory construction. The use of these intercell strap connectors has two primary advantages: the separate step required to construct intercell connectors after strap connectors are constructed is eliminated, and the resulting intercell strap connector usually goes through the partition in a straight path rather than jogging upward in the shape of an inverted U. This latter advantage results in a minimum electrical path or internal resistance and also produces a savings in materials. A disadvantage in the use of these intercell strap connectors is that there is always a slot in the partition or cover which must be filled, requiring extra effort and care. Where the intercell strap connectors are applied to the stacks outside the containers there still is the requirement of expensive machinery which holds the stacks together and constructs the intercell strap connectors, along with the two steps of placing stacks into those machines and removing elements from them before the elements are placed into the container.

Finally, British Patent specification 988,423 describes two alternative constructions which should be reviewed briefly. In the preferred construction the stacks are first placed into cell compartments, the lugs of the electrodes being held in slots in a baffle of heat and acid resistant material. The intercell strap connectors are then placed in the container, where they fit through slots in the partition, and are connected to the electrodes. The preferred embodiment is thus mindful of U.S. Pat. No. 3,350,237. As an alternative to the preferred construction, British Patent 988,423 states that the intercell strap connectors may be integrally molded with the partitions, a construction which requires that the electrode width be less than the width of the interior of the container so that the electrodes may be inserted between the intercell strap connectors.

SUMMARY OF THE INVENTION

This summary will describe the invention as it concerns multicell storage batteries until otherwise indicated.

With this invention the container is constructed in two portions, an upper portion and a lower portion, and the intercell strap connectors extend through the partitions of the upper portion of the container. It is highly desirable that the intercell strap connectors be inserts around which the partitions in the upper portion of the container are molded.

A number of advantages result from having the container constructed in two portions and from having the intercell strap connectors extend through the partitions of the upper portion of the container. First, the two previously separate steps — connection of straps to the plates in stacks and the subsequent construction of an intercell connector joining connecting straps of unlike polarity in adjacent cells — are combined into a single step, and the equipment previously needed to construct separate intercell connectors is thus eliminated. Second, one portion — either portion — of the container may serve as a fixture or jig for the stack until and while the strap connectors are connected to the plates in the stack, thus eliminating the need for the expensive element assembly machines which have served this function in prior construction. Third, the two previous steps of placing stacks in an element assembly machine and subsequently removing them, both of which were performed before the elements were placed in the container, are entirely eliminated. Fourth, the step of cementing a partition or cover slot, which step was previously required where intercell strap connectors extended through slots in the partitions of the container or cover (see U.S. Pat. Nos. 3,253,962; 3,309,232; and 3,350,237) is completely eliminated if the intercell strap connector is molded as an insert in the partition of the upper portion of the container, as is the attendant hazard that the filler piece might not produce a liquid-tight seal in the slot. Fifth, the intercell strap connectors may extend in a straight line through the partitions in the upper portions of the container (such as is shown in U.S. Pats. Nos. 3,253,962; 3,309,232; and 3,350,237) rather than jogging upward in the shape of an inverted U (such as is shown in U.S. Pats. Nos. 3,275,793; 3,313,658; and 3,336,164), resulting in a minimum internal electrical resistance and reducing the quantity of materials required to a minimum. Finally, rather than having a single piece container which requires the stack to be inserted into the container from above the molded insert intercell strap connector as does British Patent 988,423, this invention permits the stack to be inserted into the upper portion of the container from below the molded insert intercell strap connector; with this invention the molded insert intercell strap connectors need not be placed at the ends of the cell compartments and the electrodes may be nearly as wide as the cell compartment is long.

If the intercell strap connectors are inserts around the middle of which the partitions are molded, the ends of the intercell strap connectors may also be molded into other partitions so that the ends of the intercell strap connectors are anchored by the container. Thus anchored, the intercell strap connectors increase the vibration resistance of the final product.

The intercell strap connectors also serve as stiffeners along the length of the battery, increasing the rigidity of the battery. This feature is especially useful when the cell compartments are vacuum filled with electrolyte, for the vacuum tends to collapse the container and prevent filling. This is particularly true if the container is made from such flexible materials as polypropylene, where economical and thin sections may be produced with sufficient strength to withstand normal battery usage but which may tend to collapse easily when being vacuum filled.

The cover may be separate from, or integrally constructed with, the upper portion of the container. Where the cover is integrally constructed with the upper portion of the container, access must be provided so that the strap connectors may be connected to the electrodes in the stacks.

The end cell strap connectors may be molded through the exterior wall of the container to function as terminals for the battery. In prior methods of construction the terminal posts were either integrally molded with a strap connector or subsequently added to the strap connector, but in either event the terminal then had to be extended to the exterior of the cover or the container; that step is eliminated by this feature of the invention, as is the need for equipment to perform the step. The internal electrical resistance and the quantity of materials required are also minimized. If the cover is integrally constructed with the upper portion of the container, a terminal integrally constructed with a strap connector in each end cell may extend upward and be molded into the cover, again eliminating the previous separate step of extending the terminal to the exterior of the cover.

Another advantageous feature of this invention is that the ratio of height to width, known as "depth of draw" in the molding trade, of the cell compartments in the two portions of the container is reduced compared with a single piece container. This ratio of height to width is one of the criteria which determines molding difficulty; the cost of molds, percentage scrap, and other important economic penalties all rise quickly as the depth of draw increases.

While the discussion above relates to multicell batteries, most of it is also applicable to single cell batteries except that in that case the strap connectors used are not of the intercell type but are like the end cell strap connectors used in multicell batteries. Although the discussion thus far has concerned automotive batteries which are rechargeable (secondary or storage), the invention is equally applicable to non-rechargeable (primary) batteries.

Regardless of whether the methods of this invention are used with multicell or single cell batteries, certain features apply. Although the upper and lower portions of the container must ultimately be sealed together, the invention is essentially independent of specific sealing techniques, specific materials for the container and cover, and the location of the joint bettween the upper and lower portion of the container. Any technique which provides a satisfactory seal between the two portions of the container, and between the container and the cover if the cover is separately constructed, may be used; such specific techniques as sealing with heat, resin cements, and ultrasonics, to name a few, might be used. Likewise the method of this invention is independent of specific materials used to construct the container and cover; materials may be selected on the basis of cost of raw materials, ease of molding, ease of sealing, and other factors, and the two portions of the container may be of different materials if that is advantageous. Both thermoplastic and thermosetting materials may be used. (It is recognized that sealing techniques are not completely independent of the materials to be sealed, and that when one of these variables is fixed the alternatives left to the other may become restricted. For instance, if polyethylenes or polypropylenes are used, heat sealing would probably be the preferred sealing technique. With polystyrene or styrene acrylonitrile, ultrasonics would probably be selected for sealing, while the use of cements would probably provide the best sealing for polyvinylchloride, or acrylonitrile butadiene styrene. The point to be made, however, is that while the choice of materials to be sealed is interrelated with the choice of sealing techniques, this invention is not limited to either specific materials or specific sealing techniques or combinations thereof.) While it may be desirable from the point of view of sealing the upper and lower portions of the container together to have the joint between them located near the top or bottom of the stacks, the method is essentially independent of the location of the joint. The method of this invention does require a liquid-tight seal between the two portions of the container. The method is also essentially independent of the technique used to connect the electrodes with the connecting straps; in addition to burning which is presently conventional in the automotive battery industry, such other techniques as bolting, crimping, or induction welding, to name several, might be used. Where heat is used, caution must be observed so that the molten metal which joins the strap connectors and electrodes does not flow errantly onto the electrodes or separators. Also, some care may be necessary so that the container is not damaged while the electrodes in the stacks are being joined to the strap connectors, but this problem can be solved by the use of techniques such as that shown in U.S. Pat. No. 3,350,237 and British Patent 988,423 (slotted heat protectors are placed over the lugs of the electrodes) or by other methods.

Another advantage of the method is that, to some extent, the steps in the method may be performed in many different sequences. For instance, where the two portions of the container must be sealed together, the electrodes connected to the strap connectors, a cover applied, and terminals added, these steps may be performed in many different sequences, some of which may be preferred to others. Such a degree of freedom is important when laying out manufacturing plants.

While not an essential part of this invention, the battery may be improved by including slots in the strap connectors to receive the lugs from the electrodes. Since it is common in the automotive battery industry to include one more negative electrode than positive electrode in each stack, each intercell strap connector could have, for instance, six slots in its positive end and seven slots in its negative end, thus assuring an anti-cell reversal feature which would prevent a stack from being placed into a cell compartment backwards. In previous constructions additional metal and/or additional container material was required to obtain an anti-cell reversal feature in individual cell compartments, but here this advantage is achieved merely by the use of different numbers of slots in the two ends of the intercell strap connectors.

BRIEF DESCRIPTION OF THE DRAWINGS

FIG. 1 is an exploded view of a six cell battery made according to the present invention. The container consists of an upper portion and a lower portion. Intercell strap connectors extend through the partitions, the partitions having been molded around the intercell strap connectors. A cover is shown separate from the upper portion of the container. Terminals project upward from strap connectors in the end cells to extend to the exterior of the cover. A stack for insertion into one of the cell compartments of the container is also shown.

FIG. 8 shows a channel molded around the strap connector.

DESCRIPTION OF THE PREFERRED EMBODIMENTS

The preferred embodiments of the invention will first be discussed as they concern a multicell battery, and subsequently a single cell battery which embodies the invention will be described.

Figure 2:
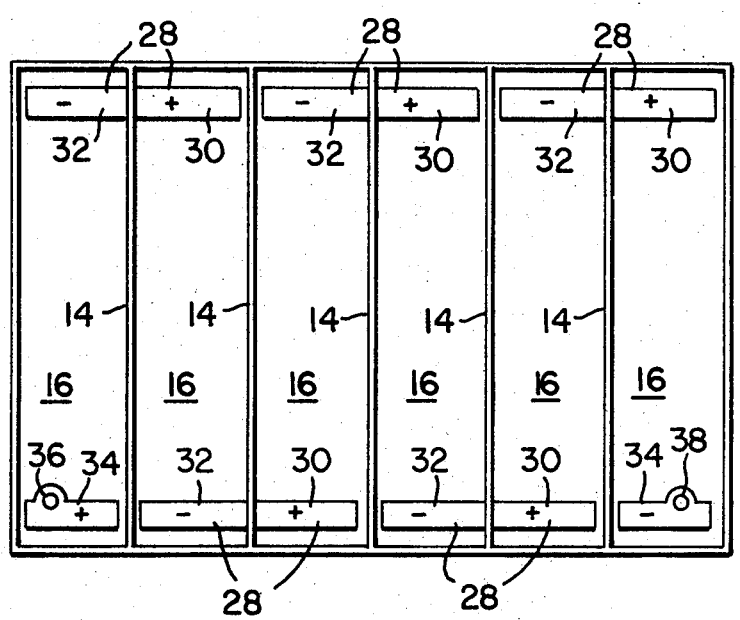
FIG. 2 is a schematic top view of a coverless container showing five intercell strap connectors and two end cell strap connectors in a six cell battery.

Discussion of multicell batteries may begin by referring to the construction shown in FIGS. 1 and 2, with subsequent figures showing alternative constructions. As shown in FIG. 1, the container is divided into an upper portion 10 and a lower portion 12, each portion having partitions 14 which divide its interior space into cell compartments 16. Into each cell compartment 16 is placed a stack 18 including alternately spaced positive electrodes 20 and negative electrodes 22. The stack shown in FIG. 1 also includes separators 24 between adjacent electrodes. The stack 18 shown in FIG. 1 is typical of many of those presently used in automotive batteries, having 7 negative electrodes and 6 positives. Each electrode is conveniently provided with a pair of feet 25 which are supported by rests 26 in the lower portion of the container. The stacks may be placed initially into either portion of the container. FIG. 1 also shows a cover 27 separately constructed from the container. The drawings show electrodes typical of those presently used in automotive batteries, and so the electrodes appear as flat, thin, rectangular, plate-like objects; these characteristics are not essential requirements of the electrodes, however, either in automotive batteries or in batteries for other purposes, and the electrodes with which this invention is concerned could also be round, thick, or tubular in configuration. The electrodes likewise do not require feet 25, these being shown only because they are conventional in automotive batteries.

As FIGS. 1 and 2 show, the battery also has two types of strap connectors to which the electrodes in the stacks are connected. The first is an intercell strap connector 28 which extends through the partitions 14 of the upper portion 10 of the container and has a positive end 30 in one cell compartment 16 and a negative end 32 in the adjacent cell compartment. Preferably the intercell strap connectors 28 are inserts around which the partitions 14 are molded; alternatively, the intercell strap connectors could be dropped into slots in the partitions and the slots subsequently sealed shut, but at the expense of additional steps and possibly less reliable results. The other type of strap connector, to be referred to as an end cell strap connector 34, occurs only in the two end cell compartments; in one end cell compartments the strap connector 34 is connected to the positive electrodes in the stack in that compartment, while the strap connector 34 in the other cell compartment is connected to the negative electrodes.

FIGS. 1 and 2 also show positive and negative terminal risers 36 and 38 respectively projecting upward from a strap connector in each of the end cells. The terminal risers, which may be cast integrally with the strap connectors or subsequently added to them, extend to the exterior of the cover and may pass through and possibly be joined with appropriate inserts or bushings 40 situated in the cover. The cover also has vent plug openings 41. The terminals 36 and 38 are shown in the drawings as round, cylindrical, post-like objects. This invention is in no way confined to specific sizes or shapes of terminals.

From the description given thus far, the steps in the construction of the battery shown in FIGS. 1 and 2 may be easily understood. Briefly, the steps are: placing stacks including alternately spaced positive and negative electrodes in each cell compartment of one portion of the container; sealing the two portions of the container together; connecting the positive electrodes of the stack in one cell compartment to one end of one intercell strap connector; connecting the negative electrodes of the stack in the adjacent cell compartment to the other end of that intercell strap connector; repeating these last two steps until both ends of all intercell strap connectors are connected to electrodes; connecting the positive electrodes of the stack in one end cell compartment to an end cell strap connector in that compartment; connecting the negative electrodes of the stack in the other end cell compartment to an end cell strap connector in that compartment; sealing a cover onto the container; extending a terminal from the positive end cell strap connector in one end cell compartment to the exterior of the cover; and extending a second terminal from the negative end cell strap connector in the other end cell compartment to the exterior of the cover. The steps need not be performed in the exact sequence just stated.

As an alternative to the method just described, the terminals might be extended to the exterior of the container rather than to the exterior of the cover. An obvious combination of these two alternatives, also within the invention, is to extend one terminal to the exterior of the cover and to extend the other terminal to the exterior of the container.

Figure 3:
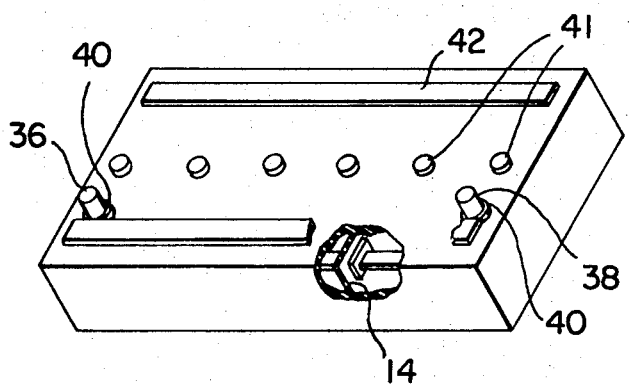
FIG. 3 is an oblique view showing the cover integrally constructed with the upper portion of the container. A fragment of the cover has been removed to show the intercell strap connector extending through the partition.

Another variation of the invention is illustrated in FIG. 3, where the cover is shown integrally constructed with the upper portion of the container. (In such an instance the distinction or dividing line between the cover and the upper portion of the container becomes difficult to define. For convenience, the object will be referred to simply as the upper portion of the container. Regardless of the terminology used to described this object, it has sufficient depth to have sections of the partitions, and the intercell strap connectors extend through those partitions as can be seen in FIG. 3 where a fragment of this object has been removed.) Since the electrodes cannot be connected to the strap connectors until the upper portion of the container is applied, some means must be provided to permit access to the electrodes and straps afterward. For this purpose the top surface of the upper portion of the container is shown being provided with a pair of portals 42 which may be closed or sealed after the electrodes and connector straps are connected. The construction steps with this alternative method are much the same as in the earlier method, except that a separate cover is not sealed onto the container and the terminals may be described simply as extending to the exterior of the container rather than specifically extending to the exterior of the upper portion of the container or the cover.

As another alternative construction, the upper portion 10 of the container shown in FIG. 1 may be modified by having the end cell strap connectors extend from the end cell compartments to the exterior of the container. This could be done easily by lengthening the strap connector and molding the outside container wall around it. As a related but still different alternative, where the combined cover and upper portion of the container shown in FIG. 3, is used, a strap connector may extend to any desired point on the exterior of the upper portion of the container, again by molding the container around the extended strap connector. The advantage of these two alternatives is that the extensions of the strap connectors serve as terminals thus eliminating any subsequent construction steps needed to obtain terminals and also possibly reducing internal electrical resistance and saving materials by reducing the length of the terminals.

Figure 4:
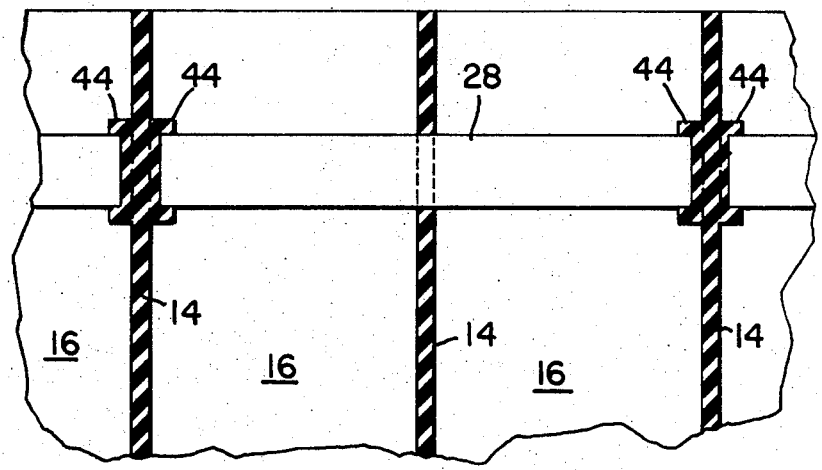
FIG. 4 is a horizontal view of part of the upper portion of the container. The figure shows one method of anchoring the ends of the intercell strap connectors by the container.
Figure 5:
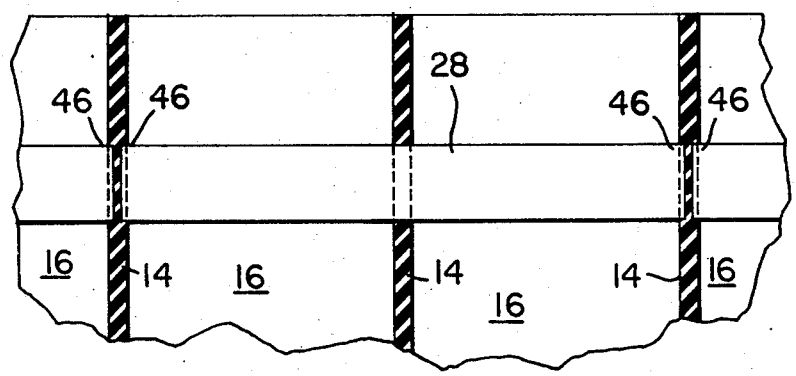
FIG. 5 is similar to FIG. 4, but shows a different method of anchoring the ends of the intercell strap connectors by the container.

Other aspects of this invention should also be described as they relate to multicell batteries. The vibration resistance of the battery may be improved by having the upper portion of the container anchor the ends of each strap connector. This is particularly easy to achieve when the intercell strap connectors are molded insertions in the partitions, for the partitions may also be molded so as to anchor the ends of the intercell strap connectors, such as by the projections 44 shown in FIG. 4 or by the recession 46 shown in FIG. 5. The end or ends of the end cell strap connectors may be similarly anchored by the container; see FIG. 6, which also shows the end cell strap connector extending to the exterior of the container to serve as a terminal.

Figure 7:
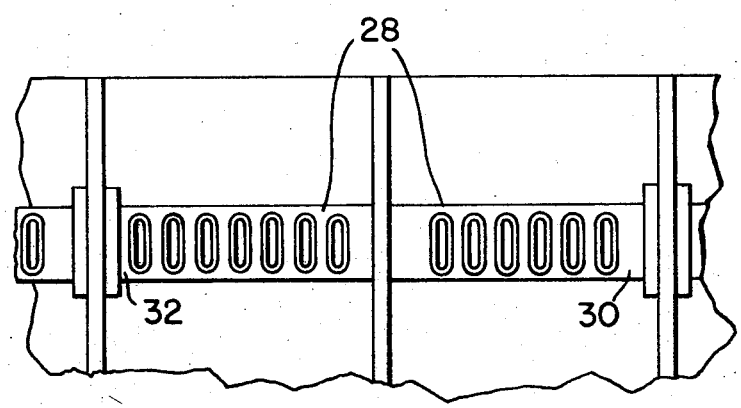
FIG. 7 is a top view of part of the upper portion of the container. The ends of the intercell strap connectors are anchored as shown in FIG. 4.
Figure 6:
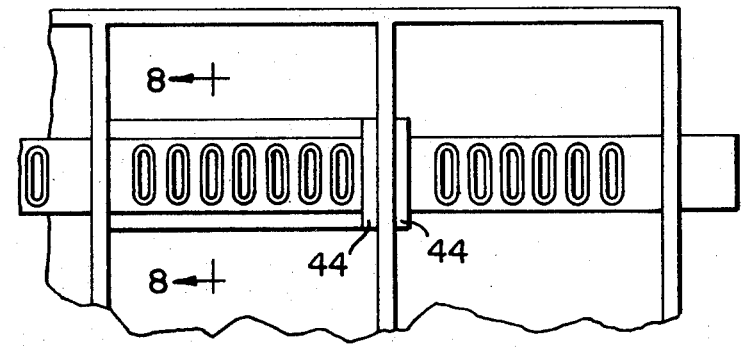
FIG. 6 is a top view of part of the upper portion of the container showing an end cell strap connector extending through the end of the container to function as a terminal.

Another feature which may easily and advantageously be employed with this invention is the use of slots in the strap connectors to receive the lugs from the electrodes. Since it is common to include one more negative electrode than positive electrode in each stack, an anti-cell reversal feature may be built into the container simply by providing the exact number of slots needed in each strap. For example, a stack consisting of seven negative electrodes and six positive electrodes cannot be installed backwards if each negative connecting strap has exactly seven slots while each positive strap has exactly six slots. This feature is illustrated in FIGS. 6 and 7. Where such straps are connected to the stacks in conventional element assembly machines, it is still possible to insert the element in a cell compartment backwards unless some other anti-reversal feature is used. Previous methods of constructing anti-cell reversal features in individual cell compartments have required additional metal in one or both of the strap connectors and/or additional container material; these extra material costs are not needed with the construction shown with this invention.

Figure 8:
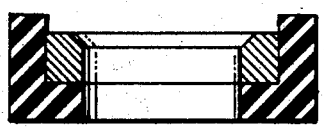
FIG. 8 is a section view taken along the line 8—8 of FIG. 6.

If a heat technique is used to connect the electrodes and the connecting straps, some provision may be required to prevent the molten metal from flowing errantly onto the plates and separators. One way to solve this problem is to use strap connectors having high sides so that the strap connectors themselves act as dams or reservoirs for the molten metal, but this is relatively expensive due to the high cost of the metal. Another solution is illustrated in FIG. 8 where a channel is shown molded beneath and around the sides of the strap connector to serve as reservoirs for the molten strap connector to serve as reservoirs for the molten metal. If any kind of shield is placed over the top of the stack to prevent damage by heat (see the slotted heat protectors of U.S. Pat. No. 3,350,237 and British Patent 988,423) or by external objects subsequently placed into the constructed battery, the shield may have an impression which serves to retain the molten metal.

For simplicity the mating surfaces of the upper and lower portions of the container are shown in FIG. 1 as being plane surfaces. It should be understood that other contours and possible flanges extending externally or internally from the upper and/or lower portions of the container may be preferable with certain materials and sealing techniques. Such constructions are all within the present invention.

From the discussion above, the application of this invention to single cell batteries is easy to visualize. The only strap connectors involved, of course, are not of the intercell type but are like the end cell strap connectors used in multicell batteries. The two strap connectors may optionally extend through the walls of the upper portion of the container to serve as external terminals. The cover may be separate from, or integrally constructed with, the upper portion of the container.

I claim:

1. A portion of a battery container comprising
   a. a plurality of exterior walls defining an enclosed space and having at least one partition wall dividing the enclosed space into a plurality of cell compartments, each cell compartment being open at both the top and bottom; and,
   b. an electrically conductive intercell strap connector around which the partition wall is molded, the intercell strap connector extending substantially across the cell compartments on the opposite sides of the partition so that its ends may serve as strap connectors for electrodes, the walls of the container being molded around the ends of the intercell strap connector to improve the vibration resistance of the ends of the intercell strap connector.

2. The battery container portion of claim 1 in which projections which are integrally molded with the walls extend outward from the walls and are molded around the ends of the intercell strap connectors.

3. The battery container portion of claim 1 in which the ends of the intercell strap connector have a plurality of slots in them to receive the lugs of battery electrodes.

4. The battery container portion of claim 3 in which one end of the intercell strap connector has a greater number of slots than the other end of the intercell strap connector to provide an anti-cell reversal feature.

5. The battery container portion of claim 2 in which the ends of the intercell strap connector have a plurality of slots in them to receive the lugs of battery electrodes.

6. The battery contaniner portion of claim 5 in which one end of the intercell strap connector has a greater number of slots than the other end of the intercell strap connector to provide an anti-cell reversal feature.

7. The battery container portion of claim 1 in which a molded channel surrounds the bottom and sides of each end of the intercell strap connector, the molded channels being integrally molded with the battery container portion.

8. The battery container portion of claim 7 in which the ends of the intercell strap connector have a plurality of slots in them to receive the lugs of battery electrodes and in which the surrounding molded channels have a plurality of slots which are in alignment with those of the intercell strap connector which they surround.

9. The battery container portion of claim 8 in which one end of the intercell strap connector and its surrounding molded channel have a greater number of slots than the other end of the intercell strap connector and its surrounding molded channel.

10. The battery container portion of claim 2 in which the projections extend across the cell compartments to provide molded channels which surround the bottom and sides of each end of the intercell strap connector.

11. The battery container portion of claim 10 in which the ends of the intercell strap connector have a plurality of slots in them to receive the lugs of battery electrodes and in which the surrounding molded channels have a plurality of slots which are in alignement with those of the intercell strap connectors which they surround.

12. The battery container portion of claim 11 in which one end of the intercell strap connector and its surrounding molded channel have a greater number of slots than the other end of the intercell strap connector and its surrounding molded channel.

* * * * *